(12) United States Patent
Hagano

(10) Patent No.: US 7,757,880 B2
(45) Date of Patent: Jul. 20, 2010

(54) TANK CAP

(75) Inventor: Hiroyuki Hagano, Nishikasugai-gun (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 1004 days.

(21) Appl. No.: 11/194,733

(22) Filed: Aug. 2, 2005

(65) Prior Publication Data

US 2006/0027775 A1    Feb. 9, 2006

(30) Foreign Application Priority Data

Aug. 6, 2004    (JP)    ............................. 2004-230781
Jun. 29, 2005    (JP)    ............................. 2005-189860

(51) Int. Cl.
*B65D 41/06* (2006.01)
(52) U.S. Cl. ....................... 220/293; 220/232; 220/253; 220/288; 220/301; 220/304
(58) Field of Classification Search ................. 220/232, 220/253, 288, 293, 301, 304, DIG. 33
See application file for complete search history.

(56) References Cited

U.S. PATENT DOCUMENTS

| 4,342,208 | A | * | 8/1982 | Evans ........................... 70/165 |
| 5,183,173 | A | | 2/1993 | Heckman |
| 5,996,830 | A | | 12/1999 | Hagano et al. |
| 2003/0136785 | A1 | | 7/2003 | Hagano |

FOREIGN PATENT DOCUMENTS

| EP | 1 332 979 A1 | 8/2003 |
| JP | U-S61-169055 | 10/1986 |
| JP | 01-137863 | 9/1989 |
| JP | A-H08-143056 | 6/1996 |
| JP | 10-278957 | 10/1998 |
| JP | A-10-278957 | 10/1998 |
| JP | A-2000-56387 | 2/2000 |
| JP | A-2004-26176 | 1/2004 |

OTHER PUBLICATIONS

Office Communication issued from European Patent Office issued on Nov. 18, 2005 for the corresponding European patent application No. 2005016852.5.
Notice of rejection mailed Apr. 20, 2010 from the Japanese Patent Office in the corresponding patent application No. 2005-189860.

* cited by examiner

*Primary Examiner*—Anthony Stashick
*Assistant Examiner*—Elizabeth Volz
(74) *Attorney, Agent, or Firm*—Posz Law Group, PLC

(57) ABSTRACT

A fuel cap includes a spring stopper mechanism to lock a first spring included in a pressure regulating valve of the fuel cap. A spring stopper mechanism includes stopper support members that are formed along an inner circumference of a valve chest formation-member, and a spring support member that is held by the stopper support members and supports an upper end of the first spring. The spring support member is pressed down in an axial direction of the fuel cap against a pressing force of the spring. The spring support member at the pressed-down position is rotated relative to the stopper support members by a preset angle. The spring support member is then pressed against the stopper support members by the pressing force of the spring and is fixed by mating lock elements. This arrangement facilitates assembly of a pressure regulating valve and ensures sufficiently high assembly strength.

11 Claims, 9 Drawing Sheets

TANK CAP

This application claims the benefit of and priority from Japanese Applications No. 2004-230781 filed Aug. 6, 2004 and No. 2005-189860 filed Jun. 29, 2005, the content of which is incorporated herein by reference.

BACKGROUND OF THE INVENTION

1. Field of the Invention

The present invention relates to a tank cap having a pressure regulating valve to regulate the inner pressure of a tank.

2. Description of the Related Art

One typical example of tank caps is a fuel cap that opens and closes a fill port of a fuel tank for automobiles (see, for example, JP No. 10-278957A). The fuel cap includes a pressure regulating valve to regulate the inner pressure of the fuel tank. The pressure regulating valve includes a valve plug and a spring that applies a pressing force to the valve plug. One end of the spring is supported to press the valve plug, while the other end of the spring is fixed to an inner cover of the fuel cap. The inner cover is a resin plate with a connection hole that communicates a valve chest with the atmosphere, and is fixed to an upper end opening of a casing of the fuel cap by, for example, ultrasonic welding technique.

The ultrasonic welding technique, however, has limitation on the welding strength of the inner cover. The ultrasonic welding technique often causes weld flash, which may be invaded into the pressure regulating valve and malfunction the pressure regulating valve.

Another known technique uses a plate member that locks one end of the spring. Press engagement of locking elements provided on the plate member with the casing of the fuel cap fixes the plate member (see JP No. 1-137863A).

The large engagement force of the locking elements of the plate member with the casing of the fuel cap undesirably lowers the assembly efficiency. The small engagement force, however, lowers the assembly strength of the plate member and the casing. Namely it is difficult to make the high assembly efficiency compatible with the high assembly strength.

SUMMARY OF THE INVENTION

The object of the invention is to provide a tank cap that allows easy and efficient assembly of a pressure regulating valve and has sufficiently high assembly strength.

In order to attain at least part of the above and the other related objects, the present invention is directed to a tank cap including: a closer that seals and unseals a tank opening; a valve chest formation-member that is included in the closer and defines a valve chest, which connects inside with outside of a tank; and a pressure regulating valve that is received in the valve chest and opens and closes a valve flow path formed in the valve chest to regulate inner pressure of the tank.

The pressure regulating valve has a valve plug that opens and closes the valve flow path, a spring that has one end pressing the valve plug in a closing direction, and a spring stopper mechanism that supports the other end of the spring, The spring stopper mechanism has a stopper support member that is included in the closer, and a spring support member that is held by the stopper support member and supports the other end of the spring.

The spring support member has a mating lock element that is inserted in an axial direction of the closer against a pressing force of the spring to be not in contact with the stopper support member and is rotated by a preset angle relative to the stopper support member at a position of insertion by a predetermined degree, so as to engage with the stopper support member.

The mating lock element is configured to be pressed against the stopper support member by the pressing force of the spring.

The tank cap of the invention has the pressure regulating valve in the valve chest formed in the closer. The pressure regulating valve has the valve plug pressed by the spring. When the differential pressure applied to the valve plug exceeds a setting load of the spring, the pressure regulating valve opens to regulate the inner pressure of a tank. The spring presses the valve plug by one end thereof and is thus supported by the valve plug. The other end of the spring is supported by the spring stopper mechanism provided in the valve chest formation member. In the spring stopper mechanism, the spring support member is inserted by the predetermined degree and is rotated by the preset angle, so that the mating lock element is held by the stopper support member. This arrangement ensures the high assembly efficiency.

The mating lock element of the spring support member is pressed against the stopper support member by the pressing force of the spring. This arrangement ensures the sufficiently high assembly strength and excellent sealing properties and prevents the spring support member from being easily detached by an external force.

This arrangement does not have the drawbacks of the prior art structure that utilizes the mechanical engagement force.

As described previously in the prior art, ultrasonic welding of the spring stop member often causes weld flash. In the spring stopper mechanism of this invention, on the other hand, the pressing force of the spring stops the spring support member. There is accordingly no problem of potential weld flash.

In one preferable embodiment of the tank cap of the invention, the spring support member has disc-shaped support body, and the mating lock element is protruded from an outer circumference of the support body.

In this preferable structure, the spring stopper mechanism further includes a positioning member that adjoins to the stopper support member in a circumferential direction and supports the spring support member in a rotatable manner at the position of insertion by the predetermined degree. Rotation of the spring support member after support on the positioning element readily attaches the spring support member to the stopper support member. This ensures the excellent assembly efficiency. In this preferable structure, the stopper support member has a locking element that engages with the mating lock element to control rotation of the mating lock element. The positioning member supports the support body to allow partial elastic deformation, while the mating lock element engages with the stopper support member. The combined functions of the locking element and the mating lock element prevent further rotation of the spring support member, while the positioning member positions and fixes the spring support member. This arrangement ensures the excellent assembly efficiency.

In still another preferable embodiment of the tank cap of the invention, the spring support member has a disc-shaped support body and an insertion space as a cut formed in an outer circumference of the support body to receive the stopper support member inserted therein. The mating lock element is a recess that is formed in the outer circumference of the support body and engages with the stopper support member.

The pressure regulating valve may include both a positive pressure valve and a negative pressure valve or may include only one of the positive pressure valve and the negative pressure valve. The positive pressure valve has a positive pressure valve plug that opens when the inner pressure of a tank increases to or above a preset level of positive pressure relative to atmosphere. The negative pressure valve has a negative pressure valve plug that opens when the inner pressure of the tank decreases to or below a preset level of negative pressure relative to atmosphere. The stopper support member may be arranged in an upper portion or in a lower portion of the closer according to the structure and the layout of the pressure regulating valve.

In one preferable structure, the stopper support member has a guide groove as a cut on a lower end of the closer, and an elastically deformable locking element that is arranged to face the guide groove. The spring support member has the mating lock element that is protruded from an outer circumference of a disc-shaped support body and engages with the locking element. In another preferable structure, the stopper support member has a guide groove as a cut on a lower end of the closer, and an elastically deformable locking element that is arranged to face the guide groove. The spring support member has a cylindrical section that is formed along an outer circumference of a disc-shaped support body and is fit in an outer circumference of a lower end of the closer, and the mating lock element that is formed on the cylindrical section to engage with a locking element.

It is preferable that the spring support member has a jig support member to support a jig, which applies a rotational force when the spring support member is held by the stopper support member. This facilitates attachment and detachment of the spring support member.

In one preferable structure, the spring stopper mechanism has a stopper that comes into contact with and supports the spring support member in a rotatable manner at the position of insertion by the predetermined degree. The stopper supports the spring support member at a stable attitude and thus facilitates attachment of the spring support member.

DESCRIPTION OF THE PREFERRED EMBODIMENTS (1) General Structure of Fuel Cap 10

Figure 1:
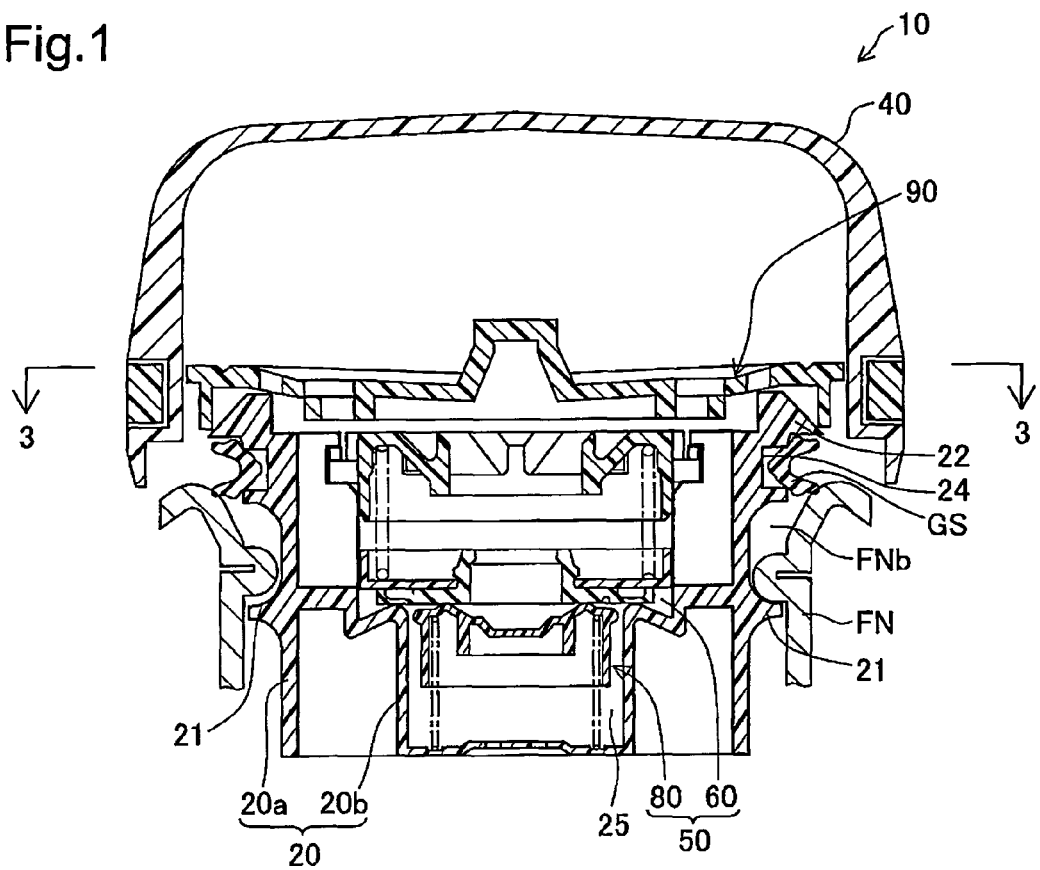
FIG. 1 is a sectional view showing a fuel cap in a first embodiment of the invention.

FIG. 1 is a sectional view showing a fuel cap 10 in a first embodiment of the invention. As illustrated in FIG. 1, the fuel cap 10 is attached to a filler neck FN having a fill port FNb (tank opening) to feed a supply of fuel to a fuel tank (not shown). The fuel cap 10 has a cap main body 20 that is made of a synthetic resin material, such as polyacetal, a cover 40 that is mounted on the cap main body 20 and has a handle made of a synthetic resin material, such as nylon, a pressure regulating valve 50 that is received in a valve chest 25, a torque mechanism 90, and a gasket GS that is attached to the upper outer circumference of the cap main body 20 to seal the cap main body 20 from the filler neck FN. The closer of the invention seals and unseals the fill port FNb (tank opening) and typically includes both the cap main body 20 and the gasket GS. The closer may alternatively include only a cap main body having the sealing functions.

The cap main body 20 has a substantially cylindrical outer tubular member 20a with a cap engagement element 21, which engages with an inner circumferential element of the filler neck FN, and a valve chest formation-member 20b that is located inside the outer tubular member 20a and defines the valve chest 25. The pressure regulating valve 50 received in the valve chest 25 includes a positive pressure valve 60 and a negative pressure valve 80 and regulates the inner pressure of the fuel tank in a predetermined range.

The gasket GS is set on a lower face of an upper flange 22 of the cap main body 20. The gasket GS is located between a seal support element 24 of the flange 22 and the fill port FNb of the filler neck FN. When the fuel cap 10 is inserted into the fill port FNb, the gasket GS is pressed against the seal support element 24 to exert the sealing effects. The torque mechanism 90 clicks when the rotational torque applied in a closing operation of the fuel cap 10 exceeds a preset level. The user can thus confirm that the fuel cap 10 is closed with the rotational torque of or over the preset level.

(2) Structure of Pressure Regulating Valve 50

Figure 2:
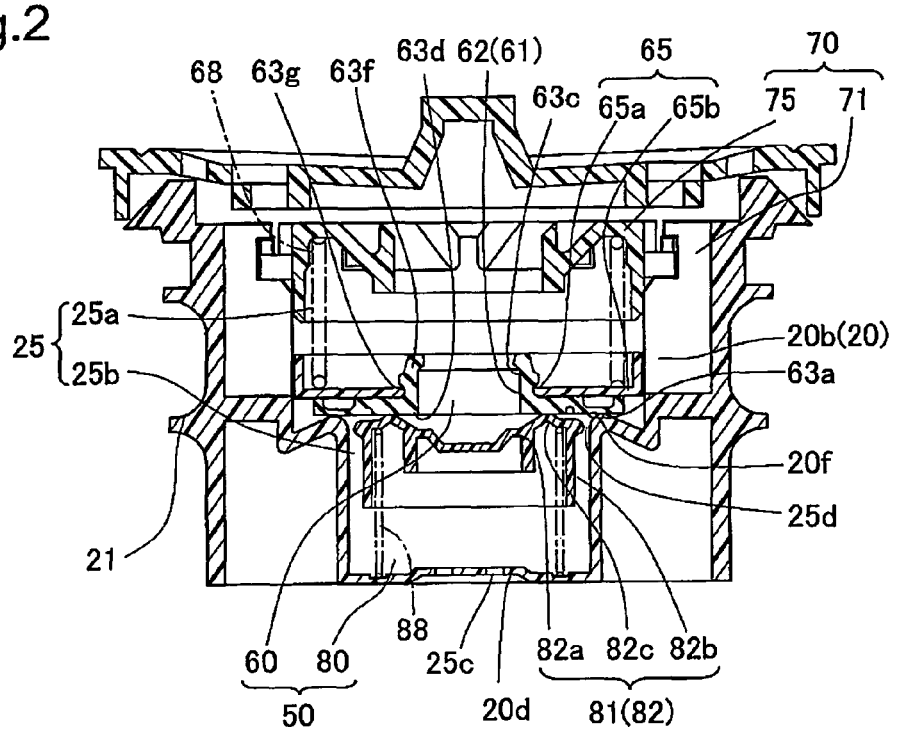
FIG. 2 is a sectional view schematically illustrating the structure of a pressure regulating valve included in the fuel cap.

FIG. 2 is a sectional view schematically illustrating the structure of the pressure regulating valve 50. The pressure regulating valve 50 includes the positive pressure valve 60 and the negative pressure valve 80. The positive pressure valve 60 is located in an upper chamber 25a of the valve chest 25, whereas the negative pressure valve 80 is located in a lower chamber 25b of the valve chest 25. A first seat element 20f is formed between the upper chamber 25a and the lower chamber 25b and is inclined from the inside of the valve chest formation-member 20b. A first valve flow path 25d is formed to face the first seat element 20f. The first valve flow path 25d communicates with a connection hole 25c formed in a bottom face 20d. The connection hole 25c is connected to the fuel tank through a filler pipe (not shown).

(2)-1 Structure of Positive Pressure Valve 60

The positive pressure valve 60 includes a positive pressure valve plug 61 to open and close the first valve flow path 25d, a valve support member 65, and a first spring 68. The positive pressure valve plug 61 has a positive pressure valve disc 62 that is made of, for example, fluorocarbon rubber and has a through hole and a projection to exert the valve functions. The positive pressure valve disc 62 has a seating element 63a that is seated on the first seat element 20f to close the first valve flow path 25d. A second valve flow path 63c connecting with the first valve flow path 25d is formed through the center of the positive pressure valve disc 62. A lower face of the positive pressure valve disc 62 faces the second valve flow path 63c and forms a second seat element 63d. The second seat element 63d works as a seat face of the negative pressure valve 80 as described later.

A substantially tubular fitting element 63f is formed upright on the center of the positive pressure valve plug 61 to surround the second valve flow path 63c. A side support recess 63g is formed on the side of the fitting element 63f. The positive pressure valve plug 61 is joined with the valve support member 65 by fitting the side support recess 63g in a fitting hole 65a of the valve support member 65. A spring support element 65b is located on the top face of the valve support member 65 to support one end of the first spring 68. The other end of the first spring is supported by a spring stopper mechanism 70.

Figure 3:
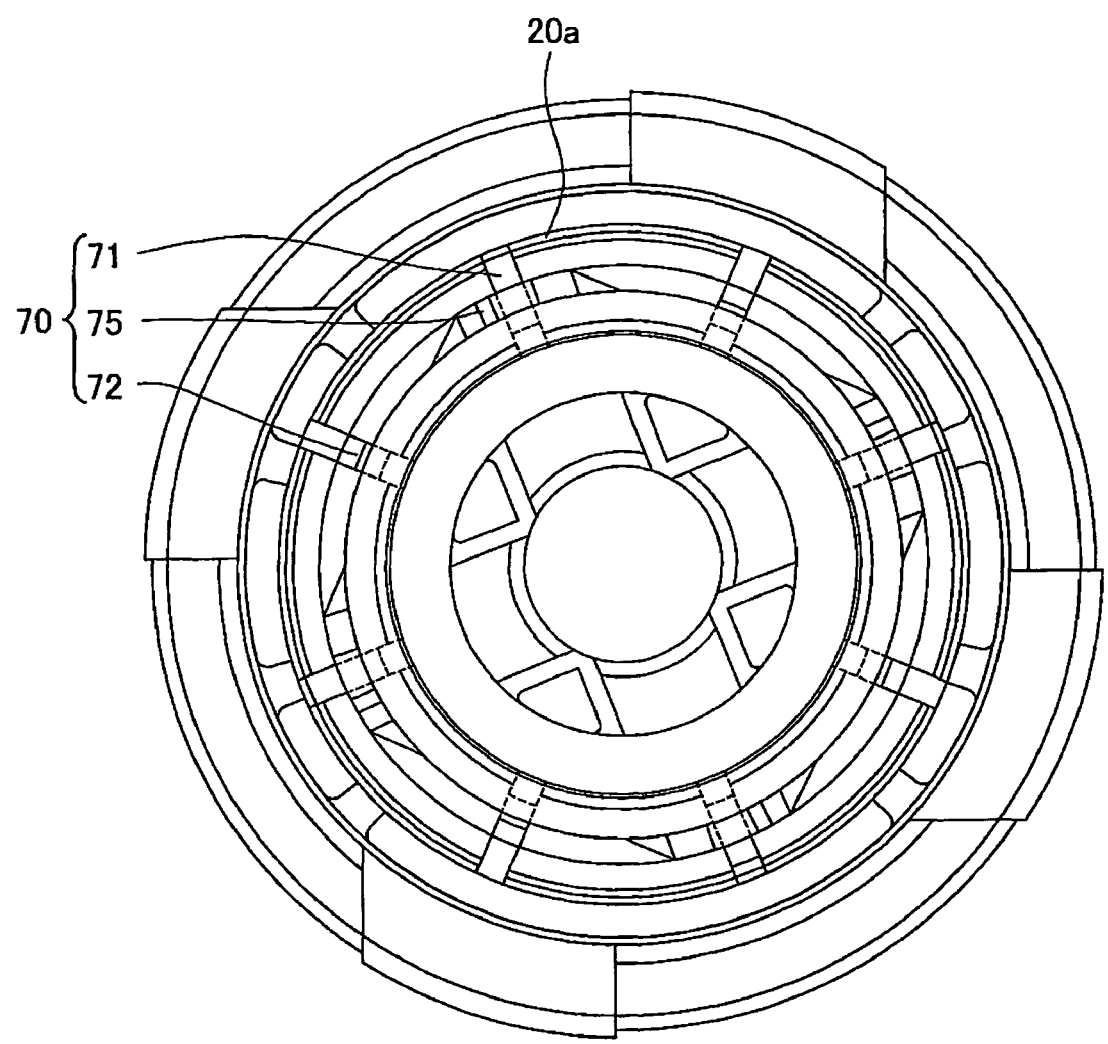
FIG. 3 is a plan view taken on the line 3-3 of FIG. 1.
Figure 4:
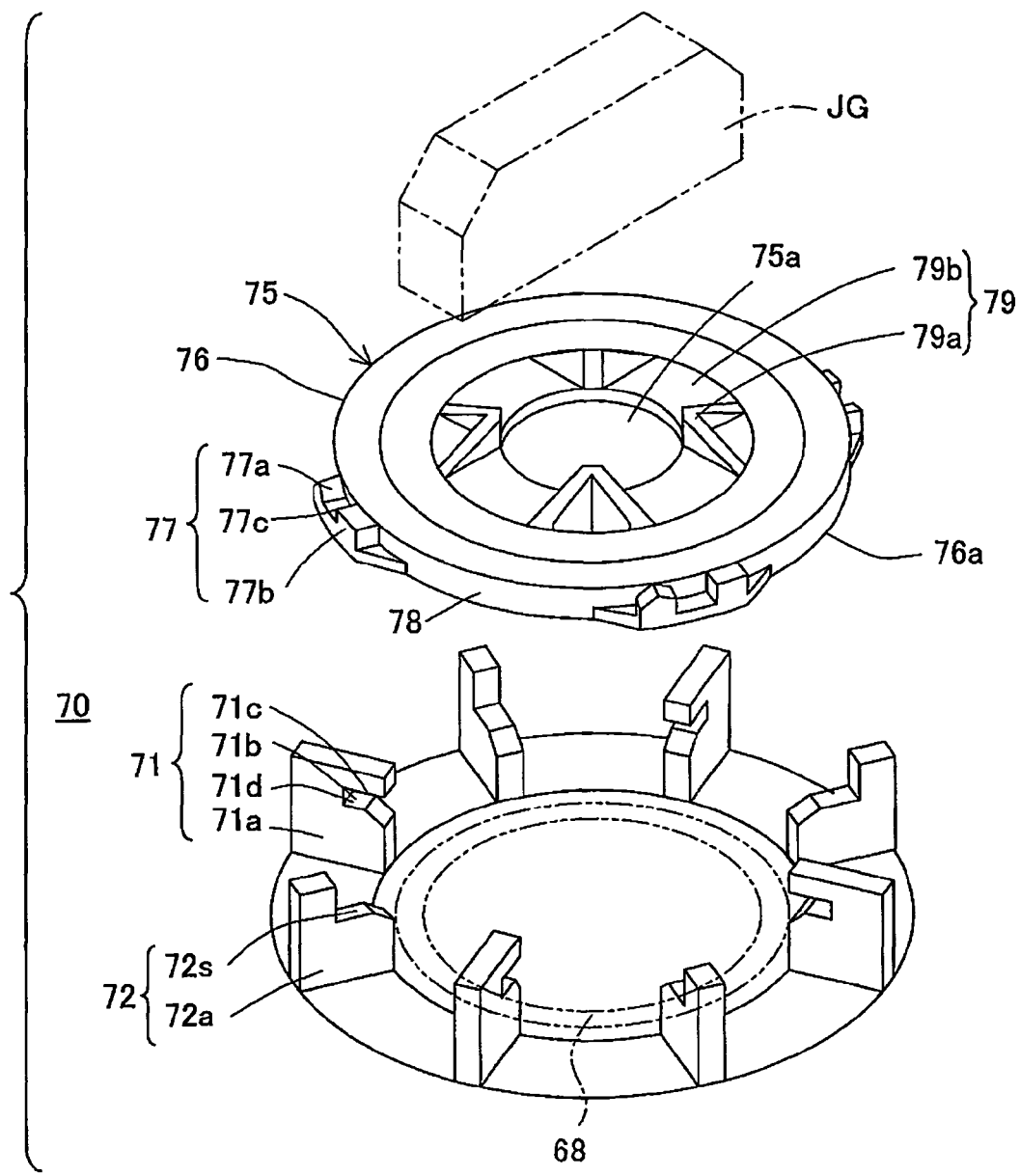
FIG. 4 shows a spring stopper mechanism in a disassembled state.
Figure 5:
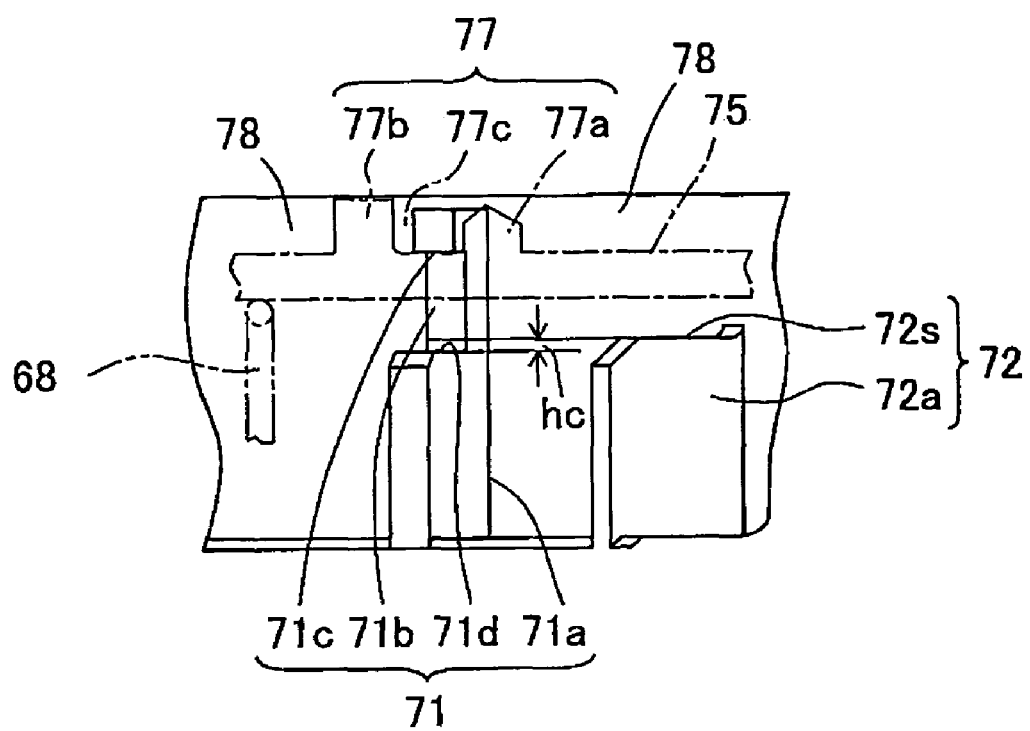
FIG. 5 illustrates the main part of the spring stopper mechanism.

FIG. 3 is a plan view taken on the line 3-3 of FIG. 1. FIG. 4 shows the spring stopper mechanism 70 in a disassembled state. FIG. 5 illustrates the main part of the spring stopper mechanism 70. The spring stopper mechanism 70 includes stopper support members 71 and positioning members 72 that are formed on the inner wall of the outer tubular member 20a, as well as a spring support member 75 that engages with and is held by the stopper support members 71. As shown in FIG. 4, the four stopper support members 71 are arranged along the circumferential direction at an interval of 90 degrees. Each stopper support member 71 has an upright wall 71a, a cut 71b, and a locking element 71c. The four positioning members 72 are placed between the stopper support members 71 and are arranged along the circumferential direction at an interval of 90 degrees. Each positioning member 72 has an upright wall 72a and a stopper 72s formed on an upper face of the upright wall 72a. The height of the stopper 72s of the positioning member 72 is higher than the height of a step 71d of the stopper support member 71 by a length 'hc' as shown in FIG. 5.

Referring back to FIG. 4, the spring support member 75 has a disc-shaped support body 76 with a through hole 75a and locking elements 77 formed on the outer circumference of the support body 76. The outer circumferential face of the support body 76 between the adjacent locking elements 77 forms an insertion element 78. The bottom face of the support body 76 forms a spring support face 76a to support the upper end of the first spring 68. The four locking elements 77 are arranged along the circumferential direction at an interval of 90 degrees. Each locking element 77 has an angled engagement projection 77a and a locking projection 77b that is protruded apart from the engagement projection 77a by a preset angle in the circumferential direction. A support space 77c is formed between the engagement projection 77a and the locking projection 77b. The locking elements 71c of the respective stopper support member 71 are fitted in the support spaces 77c of the spring support member 75 and are pressed upward by the first spring 68, as shown in FIG. 5. The spring support member 75 is accordingly held by the stopper support members 71 and supports the upper end of the first spring 68. A jig support member 79 is formed on the spring support member 75 to support a jig JG, which is used to apply a rotational force when the spring support member 75 is held by the stopper support members 71. The jig support member 79 includes four triangular upright walls 79a that are arranged along the circumferential direction, and jig insertion spaces 79b that are formed between the adjacent triangular upright walls 79a.

(2)-2 Structure of Negative Pressure Valve 80

As shown in FIG. 2, the negative pressure valve 80 includes a negative pressure valve plug 81 that is made of a resin, and a second spring 88 that is spanned between the negative pressure valve plug 81 and the bottom face 20d and presses the negative pressure valve plug 81. The negative pressure valve plug 81 has a cup-shaped negative pressure valve element 82 including an upper wall element 82a and a cylindrical side wall element 82b extended from the outer circumference of the upper wall element 82a. A circular seating element 82c is formed on the upper wall element 82a of the negative pressure valve element 82 to be seated on the second seat element 63d of the positive pressure valve plug 61 and thereby close the second valve flow path 63c.

(3) Assembly Process of Pressure Regulating Valve 50

Figure 6A:
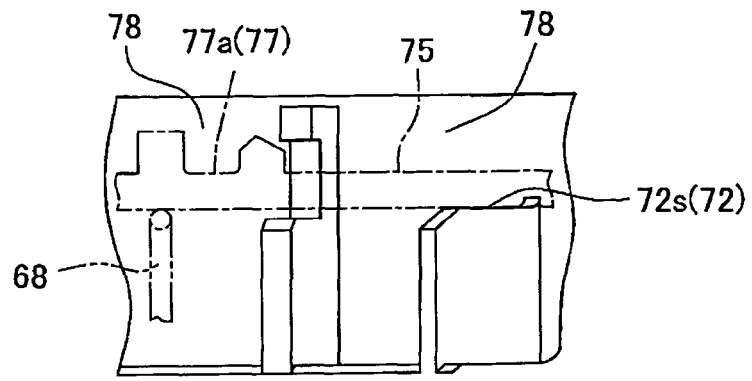
FIGS. 6A through 6D shows an assembly process of spring stopper mechanism.
Figure 6B:
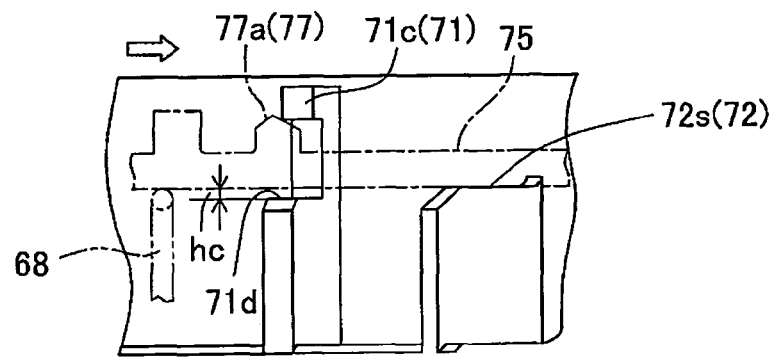
Figure 6C:
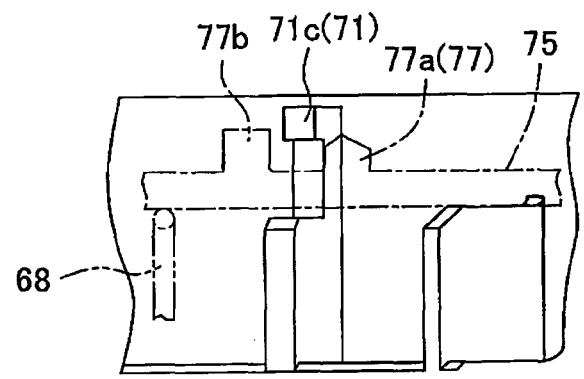
Figure 6D:
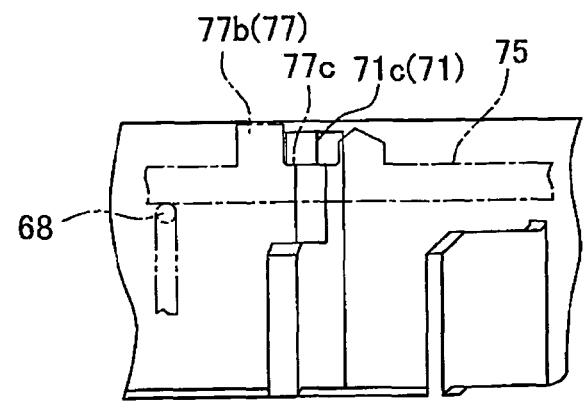

The pressure regulating valve 50 is assembled in the valve chest 25 according to the following procedure. As shown in FIG. 2, the assembly process of the pressure regulating valve 50 first sets the second spring 88 and the negative pressure valve plug 81 in the lower chamber 25b of the valve chest 25. The assembly process then places the positive pressure valve plug 61 integrated with the valve support member 65 above the negative pressure valve plug 81, and positions the lower end of the first spring 68 on the spring support element 65b. FIG. 6 shows the assembly process of the fuel cap seen from the axial center in the radial direction. As shown in FIG. 4 and FIG. 6A, the locking elements 77 of the spring support member 75 are positioned between the stopper support members 71 and the positioning members 72. After mounting the spring support member 75 above the upper end of the first spring 68, the assembly process compresses the first spring 68 and presses down the spring support member 75 by a predetermined distance to come into contact with the stoppers 72s of the positioning members 72. The jig JG shown in FIG. 4 is set in the jig insertion spaces 79d of the jig support member 79. The spring support member 75 is rotated in the direction of an arrow (clockwise) while being held on the stoppers 72s. The engagement projections 77a then come into contact with the locking elements 71c as shown in FIG. 6B. In response to a further rotation of the spring support member 75, the inclined faces of the engagement projections 77a cause a certain portion of the spring support member 75 to receive a downward force. The step 71d of each stopper support member 71 is lower than the stopper 72s of each corresponding positioning member 72 by the length 'hc'. The spring support member 75 is thus pressed down by the engagement projections 77a and elastically deformed. The engagement projections 77a then ride over the locking elements 71c as shown in FIG. 6C and come into contact with the locking elements 71c as shown in FIG. 6D. When the pressing force applied to the spring support member 75 is released, the first spring 68 presses the spring support member 75 up and keeps the locking elements 71c in the support spaces 77c. The spring support member 75 is accordingly held by the stopper support members 71 in a non-rotatable manner, while supporting the upper end of the first spring 68. The first spring 68 is spanned between the spring support member 75 and the valve support member 65 to press the positive pressure valve plug 61.

(4) Operations of Pressure Regulating Valve 50

The positive pressure valve 60 configured as discussed above works to regulate the inner pressure of the fuel tank. In the state of attachment to the fuel cap 10 shown in FIG. 2 to the filler neck FN, when the inner pressure of the fuel tank rises to a positive pressure exceeding a first pressure level, the positive pressure valve plug 61 and the valve support member 65 move up against the pressing force of the first spring 68. The inside of the fuel tank accordingly communicates with atmosphere via the flow path including the valve chest 25, the filler pipe, the connection hole 25c of the bottom face 20d, the first valve flow path 25d, the outer circumferential gap of the positive pressure valve plug 61, and the upper opening of the valve chest formation-member 20b. Such communication cancels the positive inner pressure of the fuel tank. Communication of the inside of the fuel tank with atmosphere decreases the differential pressure applied to the positive pressure valve plug 61 to be lower than the pressing force of the first spring 68. The pressing force of the first spring 68 then presses down and closes the positive pressure valve plug 61. In this manner, the positive pressure valve plug 61 is opened and closed to prevent the inner pressure of the fuel tank from exceeding the first pressure level.

When the inner pressure of the fuel tank is reduced to a negative pressure lower than a second pressure level, on the other hand, the negative pressure valve plug 81 moves down against the pressing force of the second spring 88. The negative pressure valve plug 81 is released from the second seat element 63d of the positive pressure valve plug 61, while the positive pressure valve plug 61 is seated on the first seat element 20f. In this state, a flow pathway is formed between the negative pressure valve plug 81 and the positive pressure valve plug 61. The inside of the fuel tank then communicates with atmosphere via the second valve flow path 63c, the first valve flow path 25d, and the connection hole 25c of the bottom face 20d. Such communication cancels the negative inner pressure of the fuel tank. The negative pressure valve plug 81 is closed when the differential pressure applied to the negative pressure valve plug 81 becomes lower than the pressing force of the second spring 88.

(5) Functions and Effects of Embodiment

The structure of the embodiment has the following effects, in addition to those discussed above.

(5)-1. The spring support member 75 is rotated after being placed on the stoppers 72s of the positioning members 72, and is thus held by the stopper support members 71. This structure of the spring stopper mechanism 70 facilitates the assembly process.

(5)-2. The pressing force of the first spring 68 is received upward in the axial direction by the locking elements 71c of the stopper support members 71. This prevents the spring support member 75 from being slipped off. The locking elements 71c are held between the engagement projections 77a and the locking projections 77b to interfere with rotation of the spring support member 75. This structure desirably prevents the spring support member 75 from being easily detached by an external force and keeps the good sealing properties.

(5)-3. As described previously as the drawback of the prior art technique, ultrasonic welding of the spring stop member causes weld flash. In the spring stopper mechanism 70 of this embodiment, on the other hand, the pressing force of the first spring 68 stops the spring support member 75. There is accordingly no problem of potential weld flash.

Figure 7:
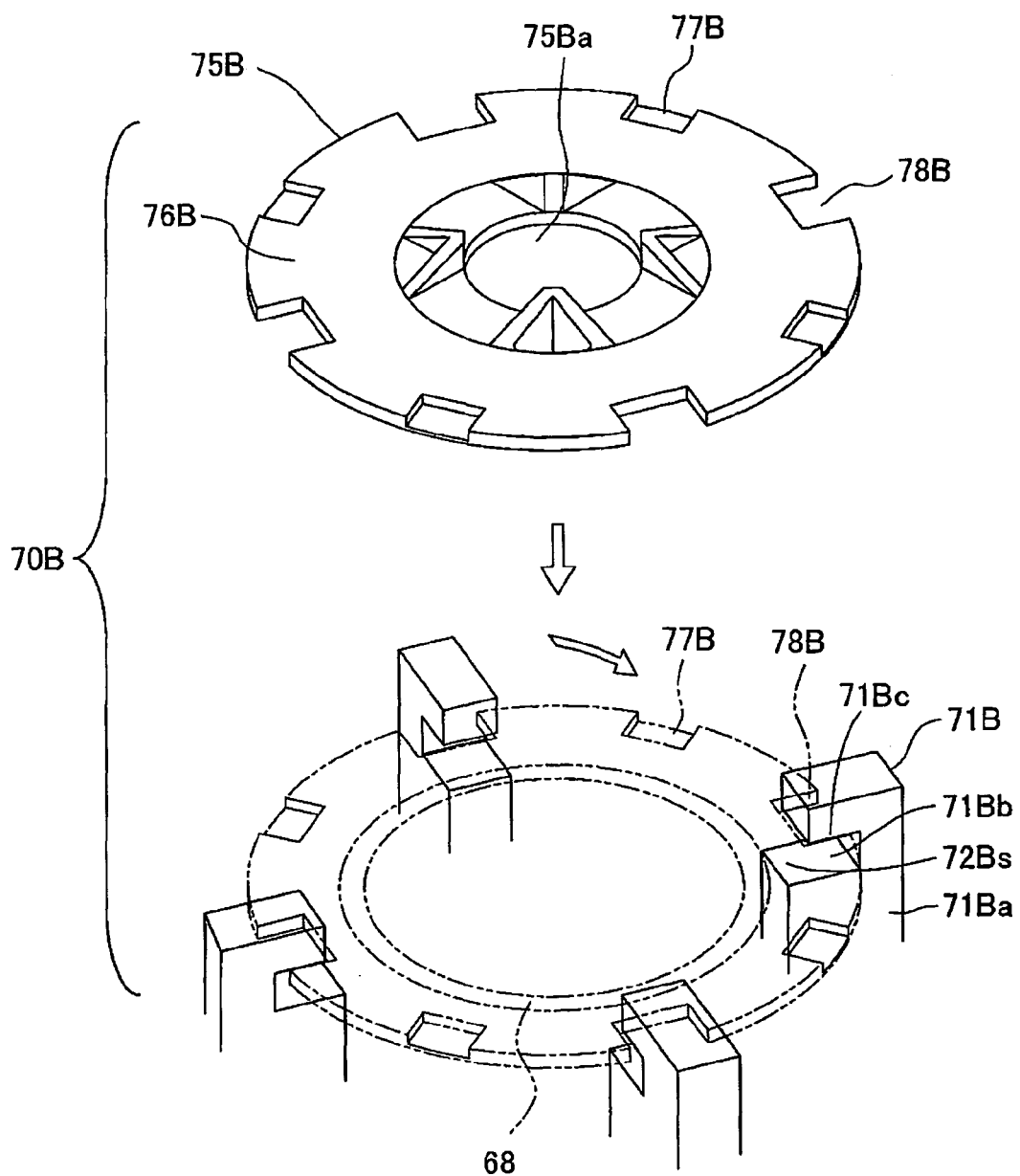
FIG. 7 schematically illustrates the structure of a spring stopper mechanism in a second embodiment of the invention.

FIG. 7 schematically illustrates the structure of a spring stopper mechanism 70B in a second embodiment of the invention. The spring stopper mechanism 70B of the second embodiment has a simpler structure with exclusion of the positioning members from the spring stopper mechanism 70 of the first embodiment. The spring stopper mechanism 70B includes stopper support members 71B that are formed along the inner circumference of a valve chest formation member, and a spring support member 75B that is held by the stopper support members 71B. The four stopper support members 71B are arranged along the circumferential direction at an interval of 90 degrees. Each stopper support member 71B includes a column support 71Ba, a cut 71Bb formed in the inner circumference of the column support 71Ba, a locking element 71Bc formed above the cut 71Bb, and a stopper 72Bs. The spring support member 75B has a support body 76B with a through hole 75Ba. Locking recesses 77B and insertion spaces 78B as cuts formed in the outer circumference of the support body 76B are arranged alternately along the circumferential direction at an interval of 45 degrees.

The assembly process holds the spring support member 75 horizontally, fits the stopper support members 71B in the insertion spaces 78B, and presses down the spring support member 75B against the pressing force of the first spring 68 to come into contact with the stoppers 72Bs. The assembly process then rotates the spring support member 75B in the direction of an arrow by 45 degrees to set the locking elements 71Bc of the stopper support members 71B in the locking recesses 77B. The spring support member 75B is accordingly held by the stopper support members 71B in a non-rotatable manner and is positioned by the pressing force of the first spring 68 to support the upper end of the first spring 68.

Figure 8:
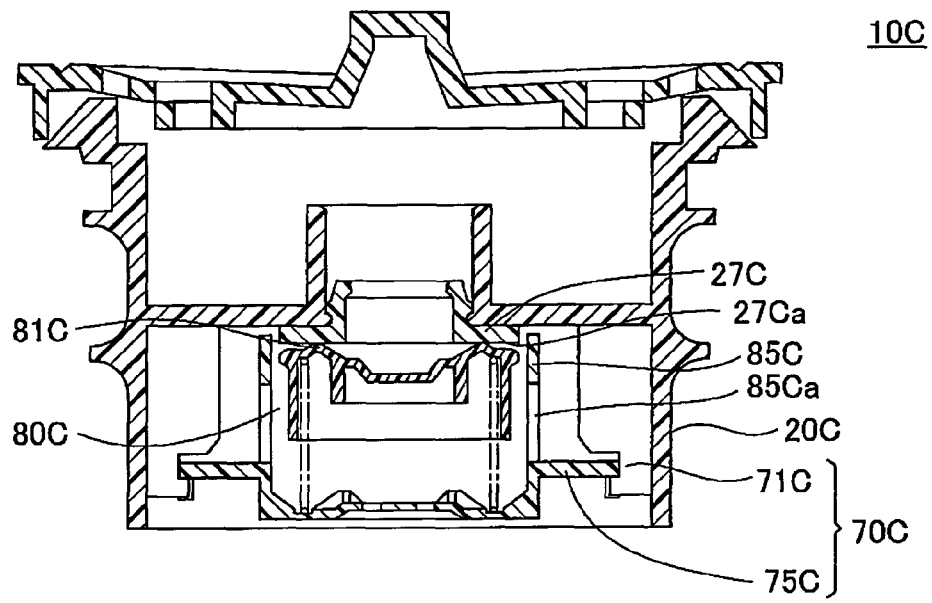
FIG. 8 is a sectional view schematically illustrating the structure of a pressure regulating valve in a third embodiment of the invention.
Figure 9:
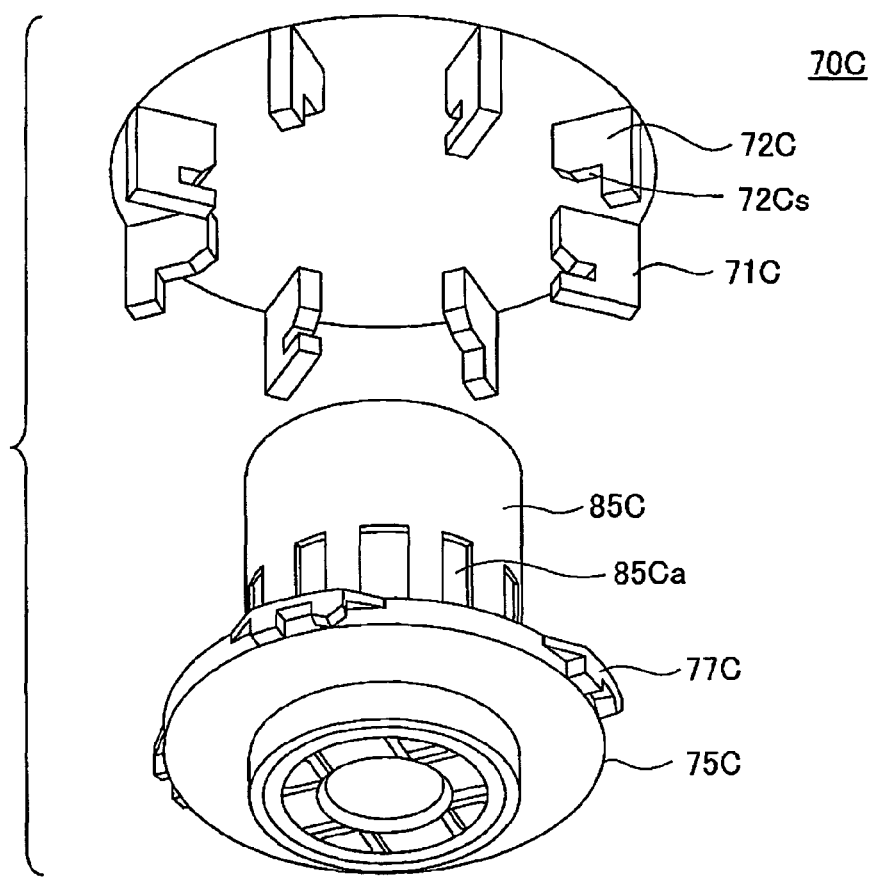
FIG. 9 shows a spring stopper mechanism in a disassembled state in the third embodiment.

FIG. 8 is a sectional view schematically illustrating the structure of a pressure regulating valve in a third embodiment of the invention. FIG. 9 shows a spring stopper mechanism 70C in a disassembled state in the third embodiment. In the structure of the third embodiment, the pressure regulating valve includes only a negative pressure valve 80C, and the spring stopper mechanism 70C is arranged in a lower portion of a cap main body 20C. The negative pressure valve 80C has a seat element 27Ca of a seat member 27C fixed to the cap main body 20C. The valve flow path of the negative pressure valve 80C is opened and closed by seating and releasing a negative pressure valve plug 81C on and from the seat element 27Ca. The spring stopper mechanism 70C has stopper support members 71C that are formed along the inner circumference in a lower portion of the cap main body 20C, positioning members 72C with stoppers 72Cs, and a spring support member 75C that is held by the stopper support members 71C. The spring support member 75C is attached upward to the stopper support members 71C in the structure of the third embodiment, whereas the spring support member 75 is attached downward to the stopper support members 71 in the structure of the first embodiment. The assembly process of the spring stopper mechanism 70C inserts the spring support member 75C into the stopper support members 71C, positions the spring support member 75C by the stoppers 72Cs of the positioning members 72C, and rotates the spring support member 75C by a predetermined angle. This causes locking elements 77C to engage with the stopper support members 71C.

A cylindrical valve flow path formation member 85C is extended upward from the spring support member 75C to improve the valve-opening characteristics of the negative pressure valve 80C. The valve flow path formation member 85C has connection holes 85Ca arranged along the circumferential direction at an interval of a preset angle. When the negative pressure valve plug 81C is opened and moves by a preset stroke to reach one of the connection holes 85Ca, the flow rate abruptly increases. This structure ensures an abrupt increase in flow rate after valve opening and quickly cancels the negative inner pressure of the fuel tank.

Figure 10:
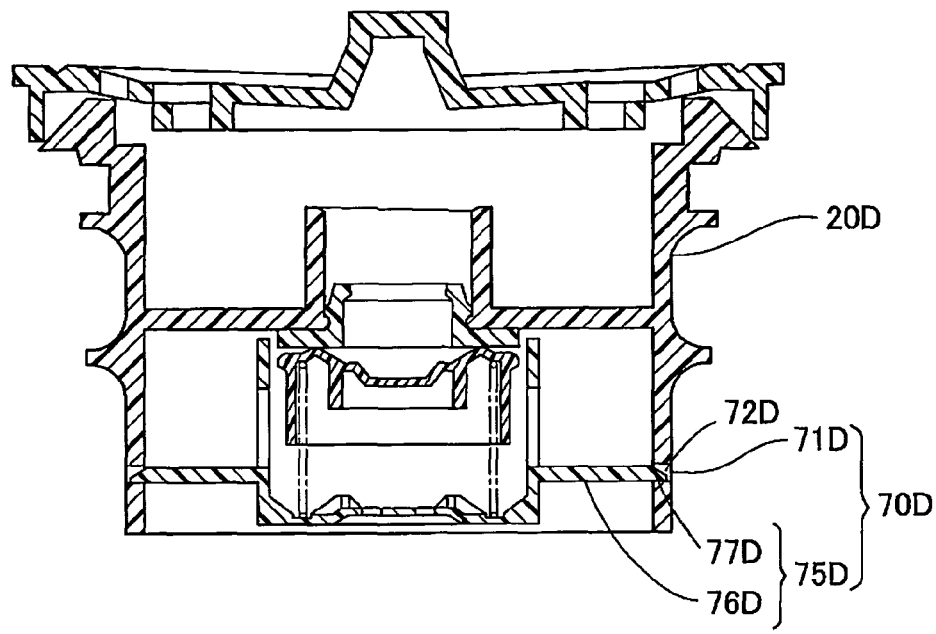
FIG. 10 is a sectional view schematically illustrating the structure of a pressure regulating valve in a fourth embodiment of the invention.
Figure 11:
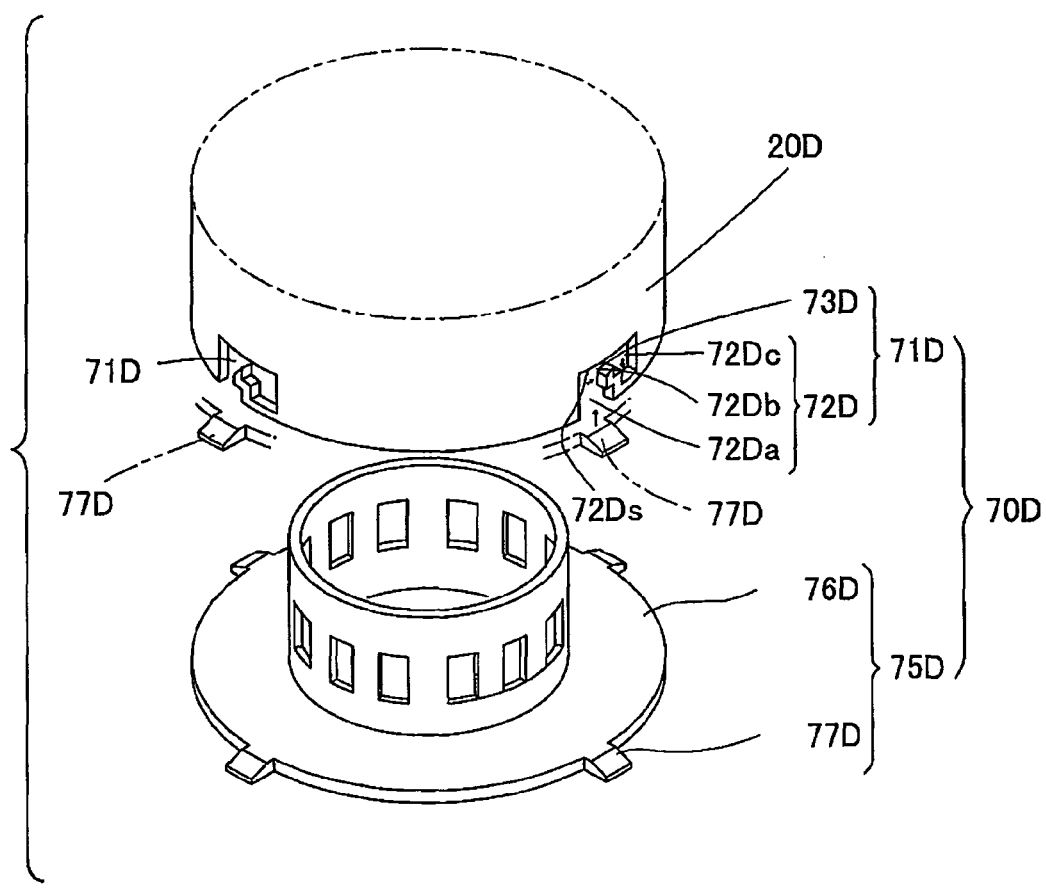
FIG. 11 shows a spring stopper mechanism in a disassembled state in the fourth embodiment.

FIG. 10 is a sectional view schematically illustrating the structure of a pressure regulating valve in a fourth embodiment of the invention. FIG. 11 shows a spring stopper mechanism 70D in a disassembled state in the fourth embodiment. The main characteristic of the fourth embodiment is the structure of the spring stopper mechanism 70D. The spring stopper mechanism 70D includes stopper support members 71D that are formed in a lower portion of a cap main body 20D, and a spring support member 75D that is held by the stopper support members 71D. Each stopper support member 71D has a U-shaped guide groove 72D open to the lower end of the cap main body 20D. The guide groove 72D includes an inlet groove 72Da formed upright from the lower end, a connection groove 72Db formed in the circumferential direction from an upper portion of the inlet groove 72Da, and a support groove 72Dc formed downward from the end of the connection groove 72Db. The upper face of the inlet groove 72Da forms a stopper 72Ds. An elastically deformable locking element 73D is formed in the connection groove 72Db. The spring support member 75D includes a support body 76D and four locking projections 77D protruded from the outer circumference of the support body 76D.

The assembly process of the spring stopper mechanism 70D positions the locking projections 77D of the spring support member 75D in the guide grooves 72D, moves up the spring support member 75D, inserts the locking projections 77D from the inlet grooves 72Da by a predetermined amount to come into contact with the stoppers 72Ds, and rotates the spring support member 75D. This causes the locking projections 77D to ride over the locking elements 73D and to be positioned by the support grooves 72Dc. The spring support member 75D is accordingly fixed by the stopper support members 71D.

Figure 12:
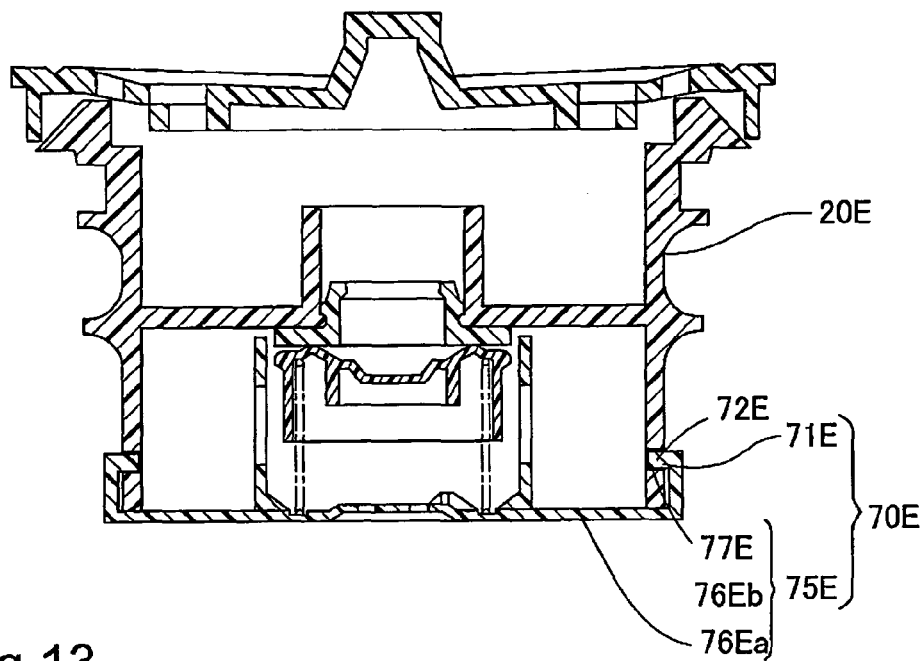
FIG. 12 is a sectional view schematically illustrating the structure of a pressure regulating valve in a fifth embodiment of the invention.
Figure 13:
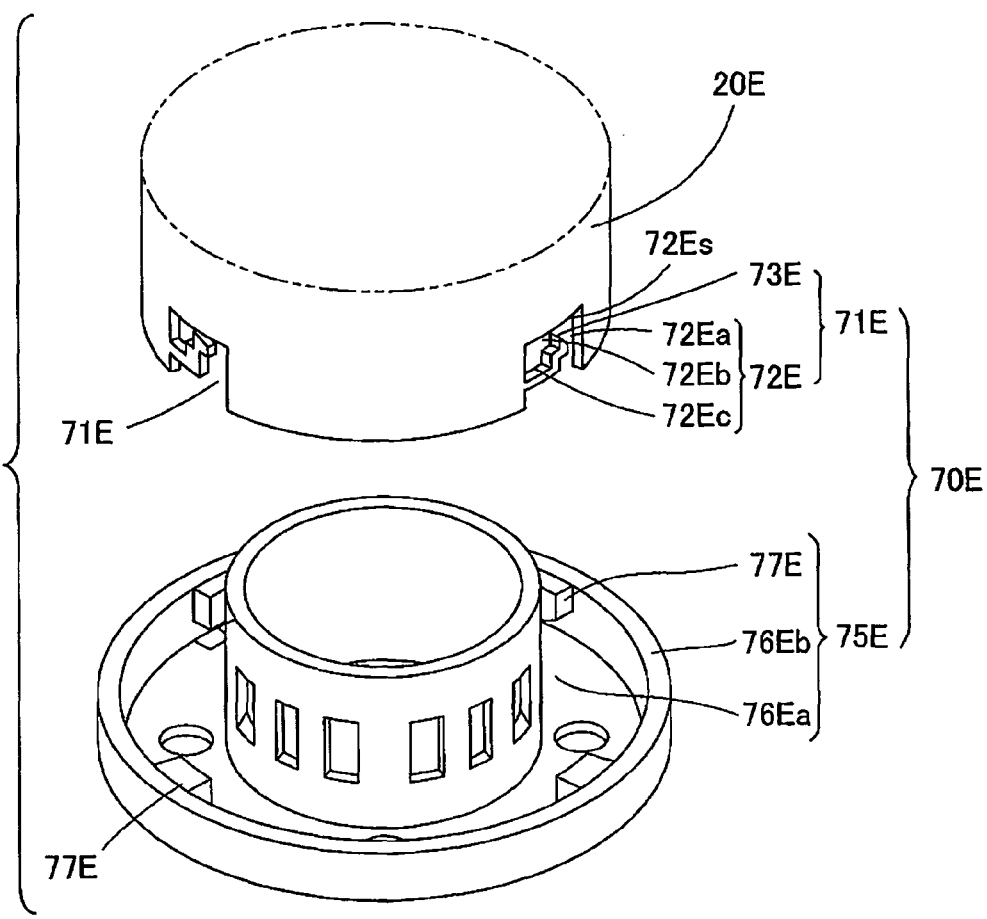
FIG. 13 shows a spring stopper mechanism in a disassembled state in the fifth embodiment.

FIG. 12 is a sectional view schematically illustrating the structure of a pressure regulating valve in a fifth embodiment of the invention. FIG. 13 shows a spring stopper mechanism 70E in a disassembled state in the fifth embodiment. In the structure of the fifth embodiment, a spring support member 75E is held by the outer circumference of stopper support members 71E formed in a lower portion of a cap main body 20E. Each stopper support member 71E has a U-shaped guide groove 72E formed in the lower portion of the cap main body 20E. The guide groove 72E has an inlet groove 72Ea formed upright from the lower end of the cap main body 20E, a connection groove 72Eb extended laterally from an upper portion of the inlet groove 72Ea, and a support groove 72Ec formed downward from the connection groove 72Eb. The upper face of the inlet groove 72Ea forms a stopper 72Es. An elastically deformable locking element 73E is formed in the connection groove 72Eb. The spring support member 75E includes a support body 76Ea, a cylindrical section 76Eb formed along the outer circumference of the support body 76Ea, and locking projections 77E protruded from the inner wall of the cylindrical section 76Eb to be apart from the support body 76Ea by a predetermined distance.

The assembly process of the spring stopper mechanism 70E positions the locking projections 77E of the spring support member 75E in the guide grooves 72E, moves up the spring support member 75E, inserts the locking projections 77E from the inlet grooves 72Ea by a predetermined amount to come into contact with the stoppers 72Es, and rotates the spring support member 75E. This causes the locking projections 77E to ride over the locking elements 73E and to be positioned by the support grooves 72Ec. The spring support member 75E is accordingly fixed by the stopper support members 71E.

The embodiments discussed above are to be considered in all aspects as illustrative and not restrictive. There may be many modifications, changes, and alterations without departing from the scope or spirit of the main characteristics of the present invention. Some examples of possible modification are given below.

In the embodiments discussed above, the fuel cap includes both the positive pressure valve and the negative pressure valve. The structure of the invention is applicable to a fuel cap including only either a positive pressure valve or a negative pressure valve. The above embodiments regard the fuel cap. The structure of the invention is applicable to any cap having a pressure regulating valve to regulate the pressure in a tank.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tank cap, comprising:
a closer that opens and closes a tank opening with air-tight sealing, wherein the closer includes an outer tubular member and a valve chest forming-member formed on the outer tubular member to form a valve chest, the valve chest connecting a tank with atmosphere; and
a pressure regulating valve that is received in the valve chest and opens and closes a valve flow path formed in the valve chest to regulate inner pressure of the tank,
wherein the pressure regulating valve includes a valve plug that opens and closes the valve flow path, a spring that has an end pressing the valve plug in a closing direction, and a spring stopper mechanism that supports an other end of the spring,
wherein the spring stopper mechanism includes a stopper support member that is formed on the outer tubular member, and a spring support member that is held by the stopper support member and supports the other end of the spring,
wherein the spring support member includes a support body and a mating lock element integrally formed on the support body, the mating lock element being configured to be inserted in an axial direction of the closer against a pressing force of the spring by a predetermined distance to be not in contact with the stopper support member and then is rotated by a preset angle relative to the stopper support member at a position of the predetermined distance, so as to engage with the stopper support member, and being configured to be pressed against the stopper support member by the pressing force of the spring.

2. The tank cap in accordance with claim 1, wherein the support body is a disc-shaped support member, and
the mating lock element is protruded from an outer circumference of the support body.

3. The tank cap in accordance with claim 2, wherein the spring stopper mechanism further includes a positioning member that adjoins to the stopper support member in a circumferential direction and supports the spring support member in a rotatable manner at the position of insertion by the predetermined distance.

4. The tank cap in accordance with claim 3, wherein the stopper support member includes a locking element that engages with the mating lock element to restrict rotation of the mating lock element, and the positioning member supports the support body to allow partial elastic deformation, while the mating lock element engages with the stopper support member.

5. The tank cap in accordance with claim 4, wherein the stopper support member has a step disposed to face the locking element with a distance, and the positioning member has a stopper that comes into contact with and supports the spring support member in a rotatable manner at the position of insertion by the predetermined distance, the step being lower than the stopper by the length.

6. The tank cap in accordance with claim 1, wherein the spring support member includes a disc-shaped support body and an insertion space to be cut in an outer circumference of the support body to receive the stopper support member inserted therein, and the mating lock element is a recess that is formed in the outer circumference of the support body and engages with the stopper support member.

7. The tank cap in accordance with claim 1, wherein the pressure regulating valve includes a negative pressure valve, the stopper support member is formed in a lower portion of the closer, and the spring support member is attached to the stopper support member to support a lower end of the spring.

8. The tank cap in accordance with claim 1, wherein the stopper support member includes a guide groove to be cut on a lower end of the closer, and an elastically deformable locking element that is arranged in the guide groove, and the mating lock element of the spring support member is configured to be protruded from an outer circumference of a disc-shaped support body and engage with the locking element.

9. The tank cap in accordance with claim 1, wherein the stopper support member includes a guide groove to be cut on a lower end of the closer, and an elastically deformable locking element that is arranged in the guide groove, and the spring support member includes a disc-shaped support body, and a cylindrical section that is formed along an outer circumference of the disc-shaped support body and is fit in an outer circumference of a lower end of the closer, the mating lock element being configured to be formed on the cylindrical section to engage with a locking element.

10. The tank cap in accordance with claim 1, wherein the spring support member has a jig support member to support a jig, which applies a rotational force when the spring support member is held by the stopper support member.

11. The tank cap in accordance with claim 1, wherein the spring stopper mechanism has a stopper that comes into contact with and supports the spring support member in a rotatable manner at the position of insertion by the predetermined distance.

\* \* \* \* \*